United States Patent [19]

Dodelin et al.

[11] 4,429,472
[45] Feb. 7, 1984

[54] SOLAR DRYER

[75] Inventors: Richard W. Dodelin, 4430 Jewell St., San Diego, Calif. 92109; Darrell W. Hurst, San Diego; George R. Osos, Costa Mesa, both of Calif.

[73] Assignee: Richard W. Dodelin, San Diego, Calif.

[21] Appl. No.: 243,740

[22] Filed: Mar. 16, 1981

[51] Int. Cl.³ .............................................. F26B 3/04
[52] U.S. Cl. .......................................... 34/48; 34/93; 34/133
[58] Field of Search .................. 34/46, 48, 93, 53, 133; 126/429

[56] References Cited

U.S. PATENT DOCUMENTS 3,508,340  4/1970  Kombol ................................ 34/53
3,942,265  3/1976  Sisler et al. ............................. 34/48
4,122,828  10/1978 Di Peri .................................. 34/93

OTHER PUBLICATIONS

SunBlast Solar Panel Literature.

Primary Examiner—L. I. Schwartz
Attorney, Agent, or Firm—Lyon & Lyon

[57] ABSTRACT

Fabrics are dried by tumbling the fabrics in a drying chamber into which hot air is introduced. The hot air is formed by passing ambient air through a solar heater to heat the air to a first temperature, and then further heating the air with a second heater such as a burner. The burner can be one which burns a fuel in the presence of combustion air. The combustion air can be a portion of the air that is passed through the solar heater.

After drying the fabrics by this method, the drying zone can be cooled and the fabrics can be further dried by passing air through the solar heater, and then without further heating the air that has passed through the solar heater, introducing the air to the drying chamber.

10 Claims, 4 Drawing Figures

SOLAR DRYER

BACKGROUND

This invention relates to a method and apparatus for drying fabrics such as textiles.

Large commercial dryers are used for drying fabrics in a variety of applications. For example, such dryers are used by commercial laundries, towel services, diaper services, and textile manufacturers and processors.

Much attention has been directed to improving the performance of such dryers. For example, U.S. Pat. Nos. 1,564,566; 3,157,391; 3,861,865; 3,882,613; 3,419,969; 3,601,903; 3,815,257; 3,831,294; 3,921,308; 3,995,998; and 4,010,550, and U.S. patent application Ser. No. 42,134 filed May 24, 1979, now U.S. Pat. No. 4,268,247, all relate to improvements in dryers and/or drying of textiles. All of these patents and the patent application are incorporated herein by this reference.

Commercially available dryers are able to quickly dry large quantities of fabrics. In a typical drying cycle, hot air is introduced into a tumbled drying chamber for about 15 minutes to dry the fabrics, and then the drying chamber is cooled for an additional 5 minutes by introducing ambient temperature air. The air for drying is heated by either direct heating or indirect heating. Direct heating involves directly combining the air that is to be introduced into the drying chamber with hot gaseous combustion products of a fuel such as natural gas or fuel oil. With indirect heating, the air to be introduced into the drying chamber is heated with a heat-exchange apparatus which can contain as a working fluid steam, or the air is heated with electric heaters.

Regardless of the method used for heating the air, drying usually requires burning of a fossil fuel. Due to recent escalations in the price of fossil fuels, drying fabrics has become very expensive. Therefore, attention has been directed to methods for increasing the efficiency of dryers. In addition, attention has been directed to methods for reducing the length of the drying cycle. More efficient utilization of equipment and labor could be obtained if the time required for drying a batch of fabrics could be reduced.

Therefore, it is apparent that there is a need for a method and apparatus for drying fabrics that reduces the fuel cost for drying, and also reduces the length of the drying cycle.

SUMMARY

The present invention is directed to a method and apparatus with these features. According to the method, a hot drying gas containing air is introduced into a drying chamber or zone containing fabrics to dry the fabrics. The air is heated by passing it through a solar heater to heat it to a first temperature higher than ambient temperature. Subsequently, the air is further heated in a second heater to a temperature of at least about 300° F. for introduction into the drying chamber.

An apparatus for practicing this method comprises a solar heater capable of directly heating air and a blower for passing air through the solar heater to heat the air to the first temperature. There is a second heater capable of further heating the air, and means for passing air from the solar heater to the second heater. There is a drying chamber for the fabrics and means for tumbling the dryer chamber. In addition, means such as a blower are provided for introducing air heated by the second heater into the drying chamber.

With this method and apparatus, the fuel costs for drying fabrics are greatly reduced by use of the energy provided with the solar heater.

Moreover, with this apparatus, it is possible to greatly reduce the drying cycle, by as much as 20 percent. This is effected by only partially drying the fabrics with air that is heated by both the solar heater and the second heater. After the fabrics are partially dried, the second heater is turned off and air that passes through the solar heater is introduced into the drying zone, without further heating by the second heater. During this second period of time, the fabrics are further dried and the drying zone is cooled.

The solar heater can comprise a plurality of individual solar collectors, each collector comprising a plurality of parallel, side-by-side passageways connected at each end by a common manifold. Preferably the solar heater comprises at least two, and more preferably three, of these collectors connected in series.

The present invention not only reduces the fuel costs associated with drying fabrics, but also increases the efficiency of the equipment by reducing the length of the drying cycle.

DRAWINGS

These and other features, aspects, and advantages of the present invention will become better understood with reference to the following description, appended claims, and accompanying drawings where:

DESCRIPTION

The present invention is directed to a method and apparatus for drying fabrics. By the term "fabrics" there is meant flexible materials that can retain moisture, including, but not limited to synthetic and natural textiles, fibers, filaments, yarns, and the like. There is also included relatively impervious materials such as leather, and cellulosic structures like paper and wood.

Figure 1:
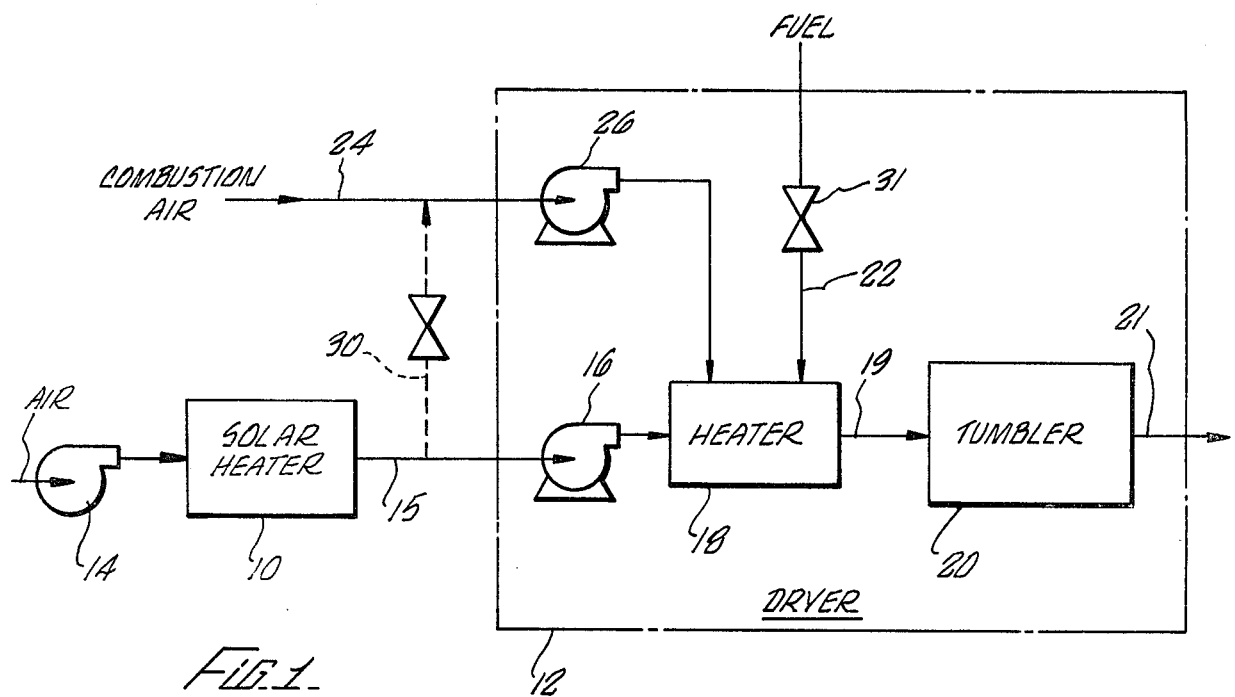
FIG. 1 is a flow sheet showing a process according to the present invention.

With reference to FIG. 1, the main components of an apparatus according to the present invention are a solar heater 10 and a dryer 12. The solar heater is provided with an inlet blower 14 for causing air to pass through the solar heater. The blower is shown in FIG. 1 on the inlet side of the solar heater, but can just as well be on the discharge side, or there can be a first blower on the inlet side and a second blower on the discharge side. Air passes through the solar heater and is heated thereby, and then passes to the dryer 12.

The dryer 12 comprises a blower 16 which receives heated air 15 from the solar heater and passes it to a second heater 18. A drying gas 19, including air heated in the heater 18, is introduce into the tumbler 20. The tumbler 20 serves as a drying zone or drying chamber for the fabrics to be dried. Spent drying gas is exhausted from the tumbler 20 through line 21.

The dryer can be any of the dryers described in the aforementioned patents and patent application. The dryer 12 shown in FIG. 1 schematically represents the configuration of a typical dryer. A large number of variations are possible. For example, the drying gas 19 can contain not only air heated by the heater 18, but can also comprise combustion products from the burning of a fuel, and recycled spent drying gas withdrawn via line 21 from the tumbler 20.

In one version of the present invention, the energy provided by the heater 18 is obtained from the burning of a fuel 22. The fuel is burned with combustion air 24 that is passed to the burner by a combustion air blower 26. A portion or all of the combustion air can comprise air 15 heated by the solar heater, which can be passed to the combustion air blower 26 through line 30. An advantage of this type of operation is that the combustion air is at elevated temperature, thereby reducing the amount of fuel that needs to be burned to achieve a desired temperature in the tumbler 20.

In operation, air provided by the inlet blower 14 is heated in the solar heater. Although any increase in temperature obtained with the solar heater is valuable, preferably the air is heated in the solar heater to a temperature that is at least about 90° F. greater than ambient, and preferably to a temperature of at least about 150° to 160° F. Air is then further heated in the second heater 18 so that the drying gas 19 is introduced into the tumbler at a temperature required for drying the fabrics in the tumbler, generally from about 300° to about 600° F. Preferably, the fabrics are only partially dried in this mode.

During a second period of time, the fabrics are completely dried and the tumbler 20 is cooled. This is effected by taking air 15 heated in the solar heater 10 and introducing it to the tumbler 20 without further heating the air 15. This can be effected by shutting off the fuel 22 to the heater 18 with a valve 31, or by passing the air 15 around the heater.

It is found that this dual mode method has significant advantages compared to prior art procedures where the fabrics are completely dried with hot air from the heater and then are cooled with ambient air. The prior art procedure requires significantly more fuel for drying, and also a longer drying cycle; typically fabrics require 15 minutes to dry and 5 minutes to cool. In this improved method using the solar heater, fabrics can be partially dried in only about 8 minutes with final drying and cooling requiring only an additional 8 minutes, giving a total cycle of 16 minutes. This is about 20 percent shorter time than required for the prior art procedure.

The solar heater 10 can be any apparatus that can utilize solar energy to heat air, either directly or indirectly. Preferably, the solar heater is one that directly heats air, i.e., there is no working fluid or solid that absorbs heat which is subsequently transferred to air.

Figure 3:
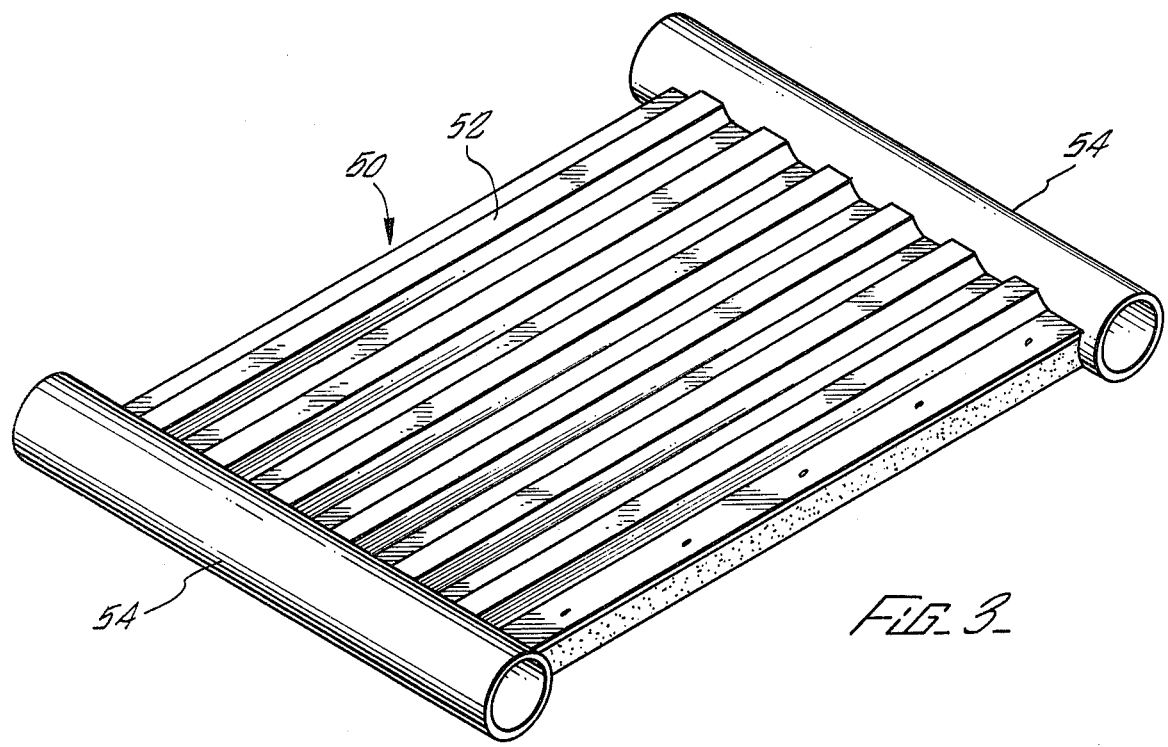
FIG. 3 is a perspective view of a solar collector shown in FIG. 2.
Figure 4:
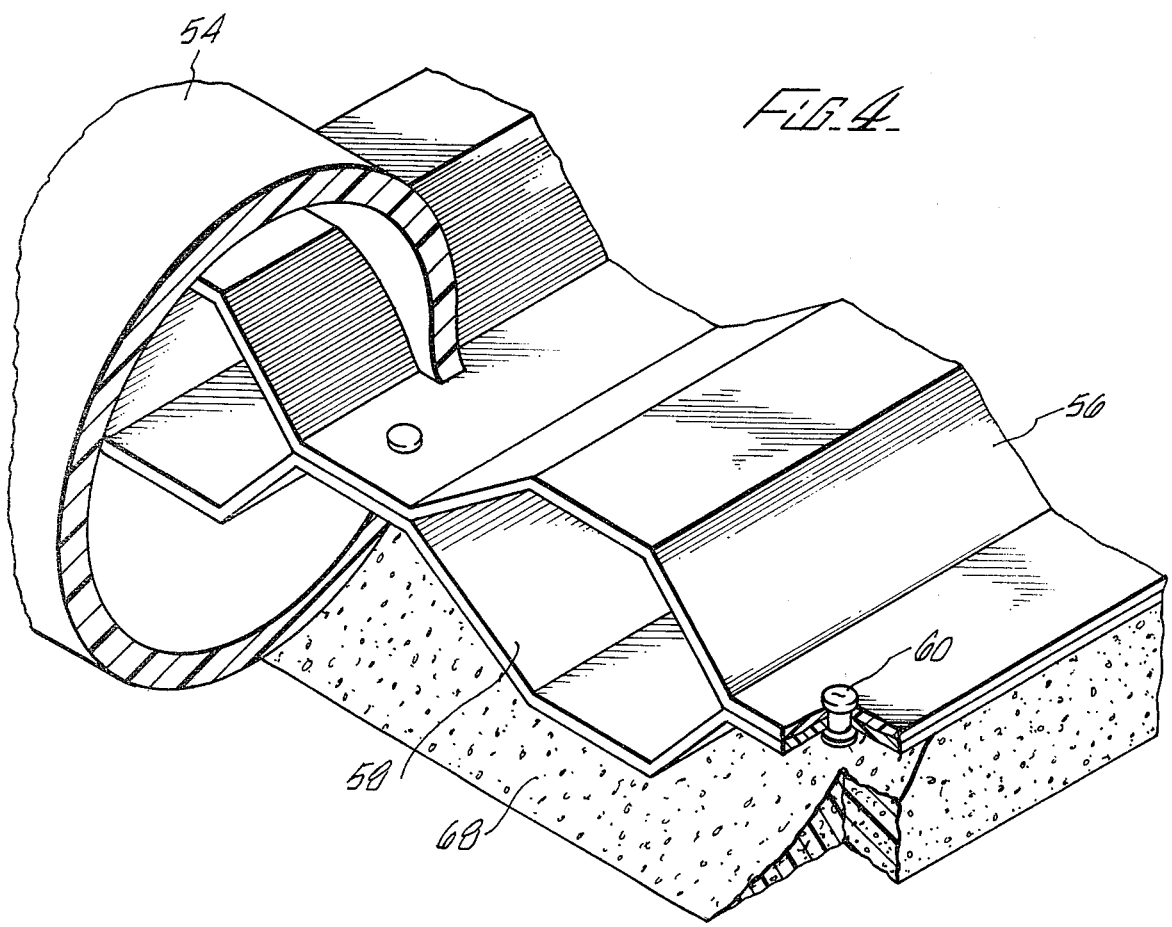
FIG. 4 shows portions of the solar collector of FIG. 3 in partial section.

A preferred solar heater comprises a plurality of individual solar collectors as shown in FIGS. 3 and 4. These solar collectors or panels are sold under the tradename "Sunblast" high velocity pneumatic solar collector panels by General Pacific Industries, Inc., of San Diego, Calif.

With reference to FIGS. 3 and 4, such a solar collector 50 comprises a plurality of parallel, side-by-side passageways or conduits 52 connected at each end by a common tubular manifold 54. One of the manifolds provides inlet air and heated air is withdrawn through the other manifold.

The passageways 52 are formed from a corrugated sheet 56 of translucent or transparent plastic material overlaying a correspondingly corrugated metallic, heat absorbing sheet 58. The two sheets 56 and 58 are held together by means of rivets 60. The sheets 56 and 58 are the same size so that their edges are coextensive.

The top sheet 56 can be made of reinforced acrylic containing ultra-violet inhibitors. The metallic sheet 58 can be made of light weight aluminum that has an internal surface that is dimpled for causing air turbulence and increasing heat transfer. Preferably, the internal surface of the aluminum has a black absorption coating such as Rust Mate flat black paint made by Zynolyte of Los Angeles, Calif. If desired, a second corrugated plastic sheet can be used overlying the top sheet 56, thereby forming an air space that serves as a heat trap.

The manifold tubes can be made of a rigid plastic, preferably black, such as ABS (acrylonitrile butadiene styrene copolymer).

An insulating layer of foam material such as polyurethane foam 68 is placed beneath the absorber sheet 58.

The riveted sheets 56 and 58 are mounted in the manifolds 54 by cutting or punching a zigzag hole into the manifold tubing and sliding the joined sheets into the hole. Any air gaps present can be closed with a silicone sealant.

It has been found that for effective heat transfer and utilization of the solar collectors 50, air passing through the collectors requires a velocity of at least about 1500 feet per minute, preferably at least about 2000 feet per minute, and more preferably about 2500 feet per minute. This corresponds to a flow of air of about 400 to 500 cubic feet per minute in that each passageway has a cross-sectional area of about 26 to 27 square inches. Each Sunblast solar collector is about four feet by ten feet, having a total surface area of about 40 square feet and a useful collector area of about 36 square feet.

The velocities specified herein are average velocities in that localized velocities through a passageway can be higher or lower than average values.

Figure 2:
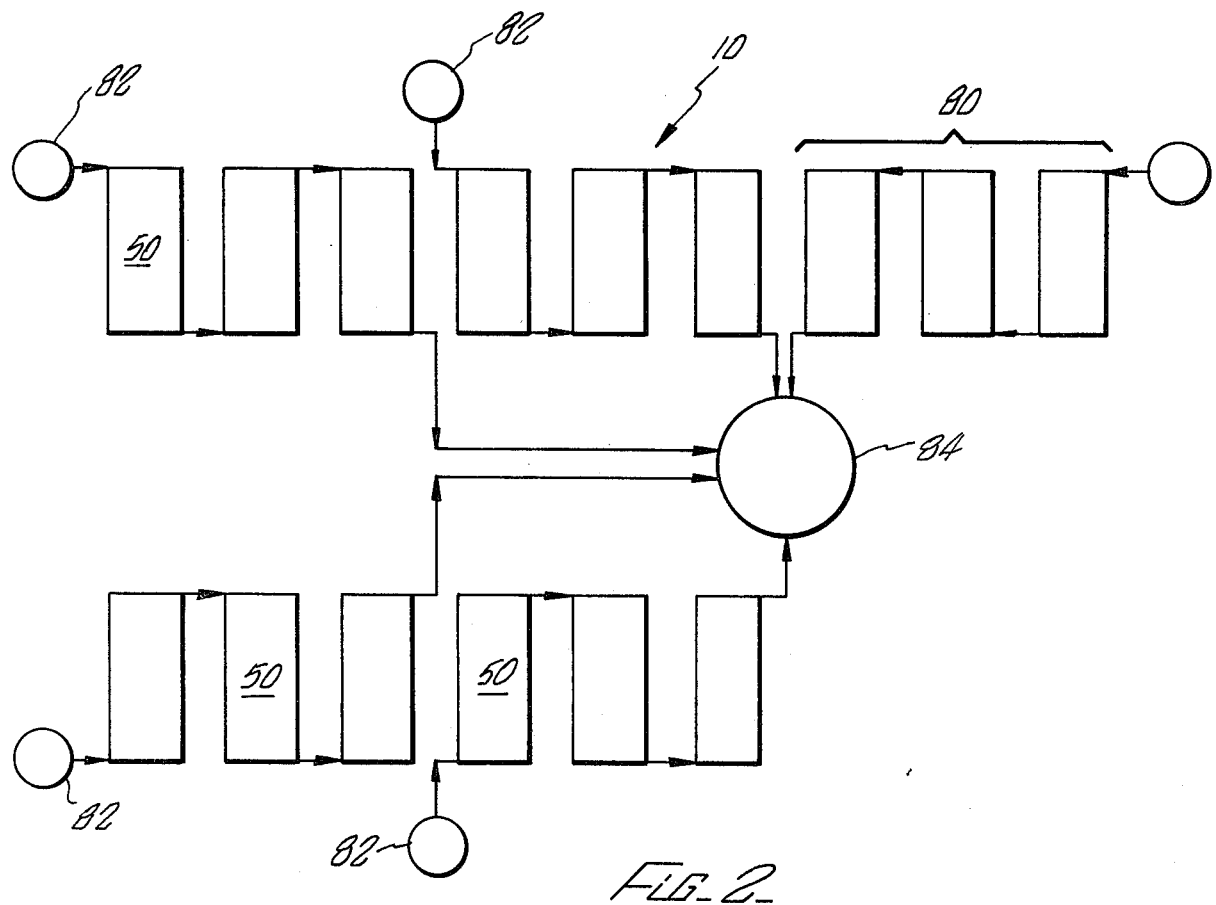
FIG. 2 shows a layout for a solar heater to be used with the process of FIG. 1, the solar heater comprising a plurality of solar collectors.

It has been found that most efficient utilization of the solar collectors is obtained if the collectors are connected in series, preferably in groups of about three. Such a layout for a solar heater 10 is shown in FIG. 2. The solar heater 10 comprise five arrays 80, each array comprising three solar collectors 50 connected in series. At the inlet to each array is a blower 82 that provides the desired volume of air; thus there are five blowers 82. The air from each array is collected in a common duct 84 for passage to the dryer 12.

The present apparatus and method have been found to provide highly efficient drying of fabrics, not only in that the cost for fuel is greatly reduced, but also shorter drying cycles can be obtained.

Although the present invention has been described in considerable detail with reference to certain versions thereof, other versions are possible. Therefore the spirit and scope of the appended claims should not be necessarily limited to the description of the preferred versions contained herein.

What is claimed is:

1. A method for drying fabrics comprising the steps of:
   (a) selecting a solar heater capable of directly heating air;
   (b) placing fabrics to be dried in a drying zone and tumbling the drying zone;

(c) during a first period of time partially drying the fabrics by the steps of:
  (i) passing air through the solar heater to heat the air to a first temperature greater than ambient;
  (ii) further heating the air in a non-solar heater to a second temperature of at least about 300° F.; and
  (iii) introducing the further heated air to the tumbling drying zone containing fabrics; and
(d) during a second period of time immediately after the first period of time, cooling the drying zone and further drying the fabrics by the steps of:
  (i) passing air through the solar heater to heat the air to a temperature greater than ambient; and
  (ii) without further heating the air that has passed through the solar heater, introducing the air that has passed through the solar heater to the drying zone.

2. The method of claim 1 in which air is passed through the solar heater at a velocity of at least about 1500 feet per minute.

3. The method of claim 2 in which air is passed through the solar heater at a velocity of at least about 2000 feet per minute.

4. The method of claim 2 in which air is passed through the solar heater at a velocity of about 2500 feet per minute.

5. The method of claim 1 in which the first temperature is at least about 160° F.

6. The method of claim 1 or 5 in which the first temperature is at least about 90° F. greater than ambient temperature.

7. The method of claim 1 in which the step of further heating comprises burning a fuel with air that has been passed through the solar heater.

8. The method of claim 1 in which the solar heater comprises a plurality of solar collectors, each collector comprising a plurality of parallel, side-by-side passageways connected at each end by a common manifold.

9. The method of claim 8 in which the solar heater comprises at least two such collectors connected in series.

10. A method for drying fabrics comprising the steps of:
(a) selecting a solar heater capable of heating air;
(b) placing fabrics to be dried in a drying zone and tumbling the drying zone;
(c) during a first period of time partially drying the fabrics by the steps of:
  (i) heating air with the solar heater to a first temperature greater than ambient;
  (ii) further heating the air in a non-solar heater to a second temperature of at least about 300° F.; and
  (iii) introducing the further heated air to the tumbling drying zone containing fabrics; and
(d) during a second period of time immediately after the first period of time, cooling the drying zone and further drying the fabrics by the steps of:
  (i) heating air with the solar heater to a temperature greater than ambient; and
  (ii) without further heating the air that has been heated by the solar heater, introducing said air to the drying zone.

* * * * *